United States Patent Office 3,261,698
Patented July 19, 1966

3,261,698
REFRACTORY SHAPES
Dwight S. Whittemore, Pittsburgh, and Thomas W. Smoot, Bethel Park, Pa., assignors to Harbison-Walker Refractories Company, Pittsburgh, Pa., a corporation of Pennsylvania
No Drawing. Filed Sept. 4, 1964, Ser. No. 394,597
4 Claims. (Cl. 106—56)

The present invention relates to refractory shapes that are resistant to penetration and wetting by molten metals and slags. The invention relates, particularly, to stabilized zirconia refractories impregnated with carbon.

Heretofore, pure stabilized zirconia refractory shapes have been employed in applications where good insulating properties were paramount considerations. Other properties of stabilized zirconia, which make it a valuable refractory are: (1) very high melting point, (2) very low thermal conductivity, (3) low volatility, (4) thermal shock resistance, (5) low reactivtiy, and (6) low electrical resistivity. Important uses found, to date, include furnace linings for extreme temperature chemical reactions, setters for the firing of titanate dielectrics, and resistors for electric furnaces.

It is desirable to extend the uses of stabilized zirconia refractories, to areas where the material would be subjected to direct contact with molten metals and associated slag components. Such uses include crucibles for induction furnaces operated under very high vacuum (i.e., 5 microns), refractory nozzles for continuous casting tun dishes, vacuum induction degassing refractories, and refractory pouring nozzles.

However, pure stabilized zirconia is not especially suited, as such, for continuous contact with molten metals or slags, because of its susceptibility to setting and interstitial penetration by the trace oxide impurities associated with the metals and slags. Further, pure stabilized zirconia does not have the relatively high resistance to thermal shock desired, owing to its low thermal conductivity. The increased resistance to thermal shock is significant, in that it allows the refractory to withstand more rapid heatup and cooling rates, than otherwise, lending itself to greater flexibility in various applications.

Although unstabilized zirconia is remarkably inert when pure, the presence of the necessary stabilizer (which will be discussed more fully hereinafter) considerably increases the tendency for zirconia to react with acidic or amphoteric metal oxide compounds. Metal slag compounds usually react with the stabilizer in the zirconia to (1) destabilize the zirconia, (2) increase the penetrating ability of the slag components, (3) weaken the bond of the zirconia refractory, and (4) increase the oxide content of the metal with which it comes into contact. The increased penetration of the liquid slag components into the refractory can be especially deleterious to the physical properties thereof, in that the slag renders it nonhomogeneous, and adversely affects the thermal conductivity and thermal expansion and contraction characteristics. Also, other undesirable effects can result which are well known to those skilled in the art.

Accordingly, it is an object of the present invention to provide a stabilized zirconia refractory insulating shape, of relatively good resistance to penetration and wetting by molten metals and slags.

A further object of the invention is to prevent the destabilization of zirconia, in a stabilized zirconia refractory structure, when in direct contact with molten metals and slags.

Another object of the invention is to provide a stabilized zirconia refractory having improved thermal conductivity.

Other objects of the invention will appear hereinafter.

Briefly, in accordance with the present invention, there is provided a refractory shape of relatively good resistance to penetration and wetting, by molten metals and slags, comprising a skeletal refractory structure. The structure contains extensive interconnected interior pore space and consists essentially of, at least, partially stabilized zirconia. By partially stabilized, we mean, nominally, at least about 70% stabilized for practical purposes. In any event, one skilled in the art understands the degree of stabilization necessary to overcome the problems of changes in crystallinity, discussed below. Carbon, substantially free of volatile components and graphite, is disposed in the pore space.

To more clearly understand the invention, it is thought a brief description of the character of zirconia and stabilized zirconia, and their physical characteristics, will be useful.

Zirconia has the chemical formula $ZrO_2$. It can exist, under certain conditions, in three different crystalline forms; namely, the monoclinic, the tetragonal, and the cubic. The monoclinic form usally exists between 0 and 1000° C., the tetragonal between 1000° C. and about 1900° C., and the cubic form exists from about 1900° C. to melting at about 2700° C. In a pure system, these crystal phase transformations are reversible, but such phase changes are always accompanied by an appreciable and undesirable variation in density. Hence, although the cubic phase is the most desirable for refractory purposes, it is distressingly unstable when pure. Therefore, zirconia, upon heating and cooling under normal refractory practices, does not exhibit reversible thermal expansion; but rather, its tendency, to at least partially change its crystalline makeup during each heating and cooling cycle, eventually, causes almost complete destruction of refractory shapes fabricated thereof. Therefore, to use the otherwise desirable refractory oxide, which zirconia is, workers in the art have produced what is termed "stabilized zirconia."

Stabilized zirconia is zirconia substantially entirely exhibiting a cubic crystallite structure, the individual crystals of which are "propped," as it were, to prevent their disintegration at lower temperatures. For example, calcium oxide is conventionally used to produce a stabilized zirconia refractory material. In practice, stabilization is brought about in one method, by mixing from 3 to 6%, by weight, of 99+% calcium oxide with 97 to 94% zirconia. All of the calcium oxide and zirconia are very finely divided, i.e., 100%–325 mesh. The mixture is heated to about 2900° F. and held for a period of time sufficient to induce complete stabilization of the zirconia crystals. The product which results is assigned the formula $(Ca \cdot Zr)O_2$. Material selected to stabilize zirconia must have an ionic radius substantially the same as the ionic radius of the zirconium ion. The zirconium ion, in cubic configuration, has an ionic radii of about .87 angstrom. $Ca^{++}$ ions exhibit an average ionic radius of about 1.06 angstroms. Other materials, having an ion radius within about plus and minus 20% of the .87 angstrom radius of the zirconia, are also usable. For example, $Mg^{++}$, having an ion radius of about 0.78 angstroms, is a good stabilizer. $Y^{+++}$, which has an ionic radius of about 1.06 angstroms, is also usable. In stabilizing zirconia, ions, which make up the material used for stabilization, appear to enter the cubic structure of zirconia replacing, in part, zirconium ions in the cubic form. The minor differences in ionic radii involved in these substitutions, apparently, prevent the phase changes which take place in the pure state, thereby stabilizing the structure in the cubic phase. The thus "stabilized" zirconia crystals exhibit remarkably uniform reversible thermal expansion.

In one preferred embodiment, refractory shapes of this invention are produced by mixing high purity (i.e., at least 95% ZrO₂), partially stabilized —4 mesh (Tyler) zirconia with sufficient tempering agent, for example, water and waste sulfate liquor, to provide a formable mix. The mix is formed to a desired shape, such as, for example, by casting or hydraulic or impact pressing. The shapes are burned in excess of 2900° F. for necessary sintering and desirable densification. At this point, the shapes contain a plurality of interconnected voids (between about 15% and 30% of the structure). Then a fluidized carbonaceous material is applied to the shape, as by immersion of the shape therein or by flowing the material thereover, for a time sufficient to impregnate the shape with said material. The impregnated shape is subjected to a burn at an elevated temperature for a time sufficient to remove all volatile constituents from the carbonaceous impregnant. Such carbon remaining is generally termed "fixed carbon." The actual amount of fixed carbon remaining in the shape is, of course, dependent on the porosity of the shape and the fixed carbon content of the impregnant.

Commercially available tar or pitches that may be used in the present invention, to provide the carbon impregnant, are divided into three general classes. The first is a soft pitch and has a softening point within the range of about 80° to 100° F. This is ordinarily usable only in refractories that are subject to little or no handling. The second classification is a medium pitch and is distinguished by a softening point, within the range of 150° F. to 250° F., and by being hardenable upon cooling to room temperature. This is the pitch normally used for brick bonding purposes. The third pitch is known as hard pitch and has a softening point within the range of about 275 to 450° F. It is characterized, in that, it can be ground to a powder and handled at normal room temperatures as a powder without promptly coalescing. Other carbonaceous materials, known to those skilled in the art, may also be employed as long as they contain at least about 10%, by weight, of fixed carbon and, preferably, no less than 30%.

It is important that the final impregnated shape be free of volatile components and contains substantially no graphite. Accordingly, the high purity zirconia shapes (crucibles, pouring nozzles, etc.) are immersed, for example, in fluidized coal tar pitch (having a softening point of 155° F.), while maintained at a temperature between about 300° F. and 400° F. for a period ranging between 20 minutes and 4 hours (depending on the size of the shape and the wall thickness), so that the shapes are saturated.

Following this treatment, the tar impregnated zirconia shapes are fired in a nonoxidizing atmosphere (i.e., reducing or neutral) to a temperature of between about 1600° F. and 2200° F., for a period sufficient to drive off all volatile compounds, so that substantially pure fixed carbon remains in the interstices.

The resulting refractory is remarkably resistant to penetration and wetting by molten metals and associated slag components. Further, the resulting refractory is more resistant to thermal shock than unimpregnated, high purity zirconia shapes, owing to the former having a higher thermal conductivity than pure stabilized zirconia.

The following examples illustrate more clearly the teachings of the invention.

*Example I*

Partially stabilized —4 mesh zirconia, consisting of about 96.2%, by weight, of ZrO₂ and 3.8%, by weight, of CaO in solid solution, was blended with water to provide a formable mix. The mixture was vibration cast to form a plurality of crucibles, having a wall thickness of about ½". The crucibles were burned at a temperature of about 3000° F. The apparent porosity of the crucibles was about 23%. Some of the crucibles were immersed in molten coal tar pitch, maintained at a temperature of about 350° F., and soaked in the pitch for about 2 hours. After the soaking period, the crucibles were removed and allowed to cool to room temperature. One of the impregnated crucibles was broken so that a cross section of the wall was exposed. Initial inspection indicated that the solidified coal tar pitch had penetrated throughout the body substantially uniformly. The tar impregnated crucibles were then fired to 2000° F. and held for five hours, while packed in coke breeze (to maintain reducing, i.e., "nonoxidizing," conditions). As a result of the heating, approximately 56.5% of the tar was lost due to volatilization. The remaining 43.5% of the original tar remained as a group of fixed carbon compounds, which were substantially free of volatiles and graphite. The fixed carbon constituted about 2.3%, by weight, of the body.

The impregnated and unimpregnated crucibles were used to melt special alloys in a vacuum induction furnace. One of the carbon impregnated crucibles lasted 32 heats under severe corrosive conditions, while an unimpregnated crucible lasted only one heat under the same corrosive conditions. Another carbon impregnated crucible withstood 116 heats with no contamination of the metal of the crucible.

Portions of the carbon impregnated and an unimpregnated crucible were submitted to the testing laboratory after being in direct contact with molten metal. X-ray diffraction studies were conducted on each. Both crucibles contained about 20% unstabilized zirconia prior to use. The test results indicated that, after service, the impregnated crucible still contained 20% of unstabilized zirconia, while the unimpregnated one contained almost 50%. Accordingly, it can be appreciated that carbon impregnation prevents the destabilization of zirconia.

In further tests, the impregnated and unimpregnated crucibles were subjected to microscopic examination, at surfaces normal to the exposed walls of each crucible, to determine the extent of slag and/or metal penetration into the refractory. No appreciable infiltration of slag or metal was observed in the impregnated crucible. The structure appeared very dense and well bonded throughout. However, numerous particles of metal were observed in the pores of the unimpregnated crucible. Also, the unimpregnated crucible appeared to be very loose textured and friable.

In addition, both crucibles were examined by laser microprobe (chemical techniques). No evidence of wetting by metal or slag infiltration, into the impregnated crucible walls, was detected. Considerable carbon was still present in all areas of the sample. The unimpregnated sample, after one heat, revealed a high level of impurities (B₂O₃, SiO₂, Al₂O₃, and MgO), in the refractory groundmass, and minor diffusion of manganese and nickel to a depth of at least ⅛" into the crucible wall.

*Example II*

A plurality of pouring nozzle inserts, having a maximum wall thickness of 1¼", were prepared in the same manner as in Example I. The inserts were immersed in the coal tar pitch for a period of four hours, which was sufficient to completely saturate the body. The remainder of the processing schedule was the same as in Example I, and after visual inspection and testing, the results were found to be similar.

It is intended that the foregoing description be construed as illustrative and not in limitation of the invention.

Having thus described the invention in detail and with sufficient particularity as to enable those skilled in the art to practice it, what is desired to have protected by Letters Patent is set forth in the following claims:

We claim:

1. A method for preventing the destabilization of zirconia in a stabilized zirconia refractory structure comprising mixing high purity, at least partially stabilized zirconia with sufficient tempering agent to provide a formable mix, forming the mix to a desired shape, burning the shape, said shape having a plurality of interconnected voids, applying to the shape a fluidized carbonaceous material for a time sufficient to impregnate the shape with said material, and subjecting the shape to a burn at an elevated temperature for a time sufficient to remove substantially all volatile constituents.

2. A fired refractory shape of good resistance to penetration and wetting by molten metal and slags comprising a skeletal refractory structure characterized by extensive interconnected interior pore space amounting to between about 15 and 30% of the volume thereof and consisting essentially of at least about 70% stabilized zirconia, said shape impregnated throughout its extensive interconnected pore space with carbon substantially free of volatile components, said shape characterized by substantial resistance to destabilization of the zirconia constituting it.

3. A fired refractory crucible having good resistance to penetration and wetting by molten metal and slags comprising a skeletal refractory structure characterized by extensive interconnected interior pore space amounting to between about 15 and 30% of the volume thereof and consisting essentially of at least about 70% stabilized zirconia, said shape impregnated throughout its extensive interconnected pore space with carbon substantially free of volatile components, said shape characterized by substantial resistance to destabilization of the zirconia constituting it.

4. A fired refractory nozzle suitable for transference of molten materials having good resistance to penetration and wetting by molten metal and slags comprising a skeletal refractory structure characterized by extensive interconnected interior pore space amounting to between about 15 and 30% of the volume thereof and consisting essentially of at least about 70% stabilized zirconia, said shape impregnated throughout its extensive interconnected pore space with carbon substantially free of volatile components, said shape characterized by substantial resistance to destabilization of the zirconia constituting it.

References Cited by the Examiner
UNITED STATES PATENTS

| | | | |
|---|---|---|---|
| 2,910,371 | 10/1959 | Ryschkewitsch | 106—57 |
| 2,952,605 | 9/1959 | De Varda | 106—56 |

TOBIAS E. LEVOW, *Primary Examiner.*

J. POER, *Assistant Examiner.*